United States Patent
Jain et al.

[11] Patent Number: 6,047,325
[45] Date of Patent: Apr. 4, 2000

[54] NETWORK DEVICE FOR SUPPORTING CONSTRUCTION OF VIRTUAL LOCAL AREA NETWORKS ON ARBITRARY LOCAL AND WIDE AREA COMPUTER NETWORKS

[76] Inventors: Lalit Jain, 43 Symphony Rd., Boston, Mass. 02115; Michael T. Ford, 32 Bristol St., Cambridge, Mass. 02141

[21] Appl. No.: 09/138,959

[22] Filed: Aug. 24, 1998

Related U.S. Application Data

[63] Continuation of application No. 08/957,352, Oct. 24, 1997, abandoned.

[51] Int. Cl.[7] ............................. G06F 15/00; G06F 15/40; G06F 9/44
[52] U.S. Cl. ......................... 709/227; 709/238; 709/239; 709/245
[58] Field of Search .................................... 709/227, 238, 709/239, 245

[56] References Cited

U.S. PATENT DOCUMENTS

| | | | |
|---|---|---|---|
| 5,327,560 | 7/1994 | Hirata et al. | ............................. 709/221 |
| 5,414,812 | 5/1995 | Filip et al. | ............................. 707/103 |
| 5,636,371 | 6/1997 | Yu . | |

*Primary Examiner*—Krisna Lim
*Attorney, Agent, or Firm*—Wolf, Greenfield & Sacks, P.C.

[57] ABSTRACT

A network device that translates addresses of machines on physically separate networks and filters packets at the link, network and transport layers implements a virtual LAN over interconnected computer networks transparent to the computer networks. Using authentication and encryption, a secure connection between these network devices over a public wide area network implements a virtual private network and enables the definition of virtual LANs over the virtual private network. The network device has three tables for network address translation, routing, and filtering. A controller processes each incoming packet by translating network addresses to determine the destination of the packet, routing the packet to the determined location and filtering the packet according to filters defined for traffic between the source destination of the packet. If the packet is to be directed to a wide area network, encryption and authentication procedures can be provided to ensure secure transmission of the packet.

5 Claims, 7 Drawing Sheets

NETWORK DEVICE FOR SUPPORTING CONSTRUCTION OF VIRTUAL LOCAL AREA NETWORKS ON ARBITRARY LOCAL AND WIDE AREA COMPUTER NETWORKS

This Application is a continuation of application Ser. No. 08/957,352, filed on Oct. 24, 1997, now abandoned.

FIELD OF THE INVENTION

The present invention is related to network devices for implementing virtual local area networks and virtual private networks.

BACKGROUND OF THE INVENTION

A computer network becomes disproportionately more difficult to manage as it increases in size, complexity and geographic dispersion. Management of the network involves configuration of software available on the machines or for a user in the network, coordination of access to shared resources and implementation of security measures. In addition, communication traffic on the computer network is monitored to ensure that the system is configured appropriately to reduce security risks and to improve efficiency.

The problem of managing a computer network for an enterprise becomes more complex as the network becomes geographically dispersed. For example, the enterprise may have local-area computer networks in two separate locations that need to be interconnected in order for those two locations to communicate effectively. One common way to implement this connectivity is by encrypting and authenticating communications between the networks over a public wide-area computer network, such as the Internet. Such a system, called a virtual private network, is difficult to manage centrally.

Another problem with managing a computer network system is that users on one network are likely to need to communicate with users on another network. For example, a person in a finance department in one location, likely will need to share resources with other people in the finance department at another location. A common method for managing such communication is to use Ethernet layer switching, in combination with bridge groups, to limit the communication between machines on the connected networks. This technology is commonly called a virtual local area network (VLAN). The primary goal of a VLAN is to reduce the bandwidth used by limiting the extent to which packets of data are broadcast on the network. VLANs generally are not implemented over wide-area networks. Additionally, a machine generally is associated with only one VLAN and cannot be considered to be part of several groups at the same time.

Computer network security typically is implemented from the point of view that computer networks external to an enterprise are inherently untrusted and that computer networks internal to an enterprise are inherently trusted. As a result, security tends to be implemented using perimeter, or point of access, security mechanisms where communications from the external network enter into the internal network. Such a system, however, does not protect against internal security breaches.

SUMMARY OF THE INVENTION

A network device that translates addresses of machines on physically separate networks and filters packets at the link, network and transport layers implements a virtual LAN over interconnected computer networks transparent to the computer networks. Using authentication and encryption, a secure connection between these network devices over a public wide area network implements a virtual private network and enables the definition of virtual LANs over the virtual private network.

The network device has three tables for network address translation, routing, and filtering. A controller processes each incoming packet by translating network addresses to determine the destination of the packet, routing the packet to the determined location and filtering the packet according to filters defined for traffic between the source destination of the packet. If the packet is to be directed to a wide area network, encryption and authentication procedures can be provided to ensure secure transmission of the packet. The device permits implementation of both external and internal security measures.

Accordingly, one aspect of the present invention is a network device. The network device has at least two interfaces for connecting to two local area networks of computers. Each network has a link layer, a network layer and a, transport layer. The network device has a media access control address for each of the local area networks. The network device has a controller which maps network addresses at the network layer of machines on one network to the media access control address of the network device on the other network. Another mechanism routes packets received by the network device to the machine indicated as the actual destination according to the destination address of the network layer packet. Each packet may be filtered using information in the packet from the link, network and transport layers.

In one embodiment, the network device has at least another interface for connection to a wide area network of machines, having a network layer and a transport layer. In this embodiment, the network device has an address at the network layer of the wide area network. The mapping table maps addresses of machines on the wide area network to the media access control address of the network device on each of the local area networks. In this embodiment, when a packet is routed to the wide area network, authentication procedures are performed with another network device and the packet is sent in encrypted form to the other network device. The network device also may receive a packet from the wide area network through the third interface. Such packets are routed according to the destination address specified in the original packet before encryption.

Another aspect of the invention is a process performed by a network device for transferring a packet between a first machine on a first network and a second machine on a second network. In this process, an address resolution protocol request is received by the network device from the first machine, indicating a network layer network address of the second machine in a network protocol of the first network. An indication of the link layer network address of the network device is returned to the sender if the network layer network address corresponds to a machine on the second local area network. The sender may then send packets which are addressed at the link layer to the network device. These packets encapsulate network layer packets that will have a network layer destination address of the second machine. The link layer address of the second machine on the second local area network is then determined and an appropriate link layer packet is sent to the destination encapsulating the network layer packet received from the first machine.

DETAILED DESCRIPTION

Figure 1:
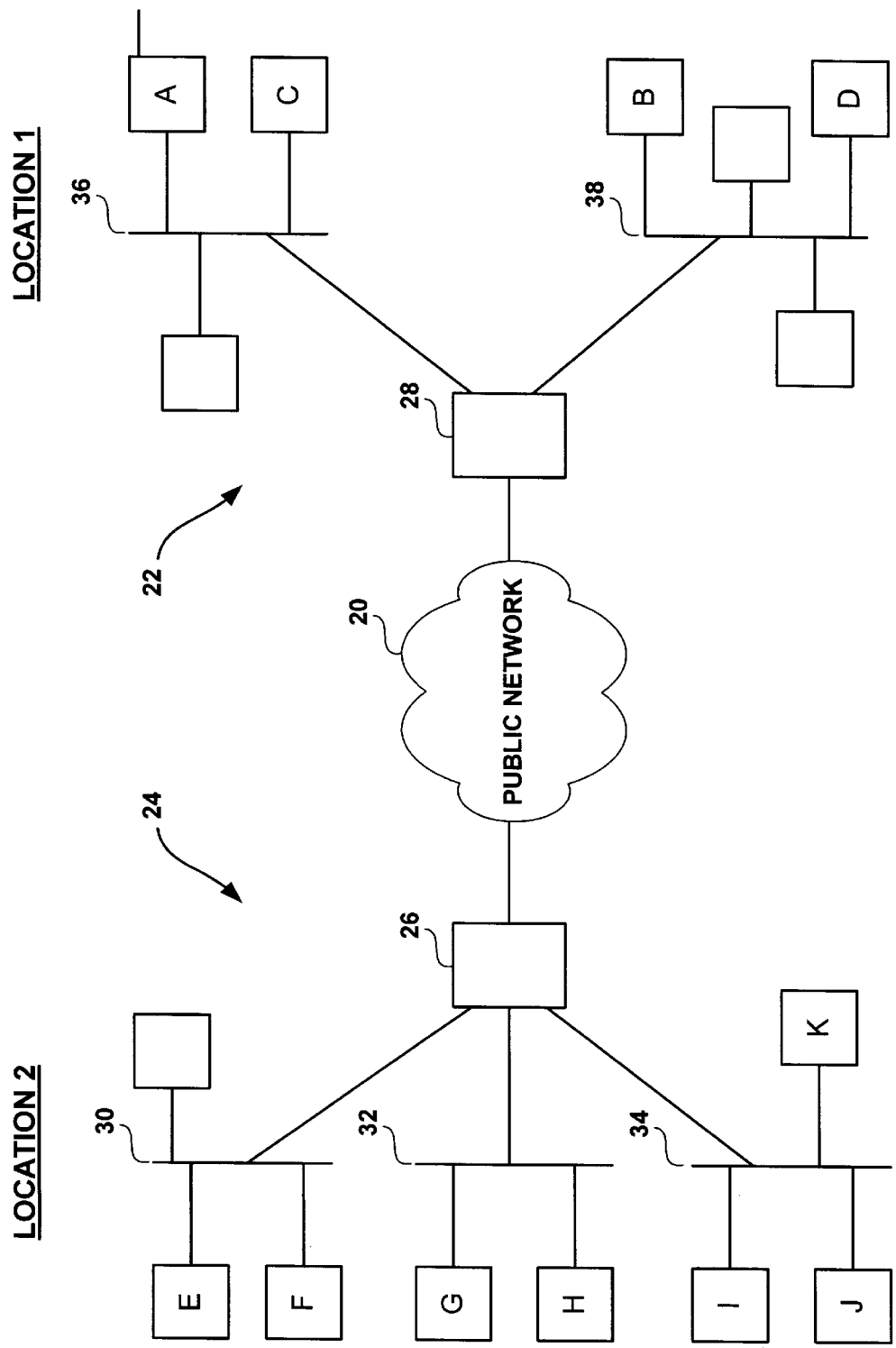
FIG. 1 is an illustration of an example computer network in which the present invention may be used.

FIG. 1 shows an example computer network with which the invention may be used. The computer network shown is a wide area network that utilizes a public computer network 20, such as the Internet, to connect local area computer networks at a first location 22 and local area computer networks at a second location 24. Communications between network devices 26 and 28 over the public computer network 20 may be encrypted and require authentication in order to form a virtual private network between the first and second locations. At the first location, the network device 28 connects to two local area networks (LANs) 36 and 38. Similarly, network device 26 is connected to three LANS 30, 32 and 34 at the second location. Each LAN is comprised of several computers, several of which are lettered in this figure using letters A through K. The computer network may have any arbitrary topology and can be comprised of a number of computers as well as network devices such as switches, routers, gateways, firewalls, etc., and other resources such as file servers, printers, etc.

While FIG. 1 illustrates the physical topology of the network, the actual use of the computer network by various individuals and groups of individuals within an organization typically does not correspond directly to this physical connectivity. In fact, within an enterprise, individuals may belong to one or more groups (such as a development group or management), and some resources may be shared by many groups. Accordingly, in the present invention, various logical groups of individual machines and groups of machines in the computer network may be defined. These groups may be considered as virtual LANs.

Figure 2:
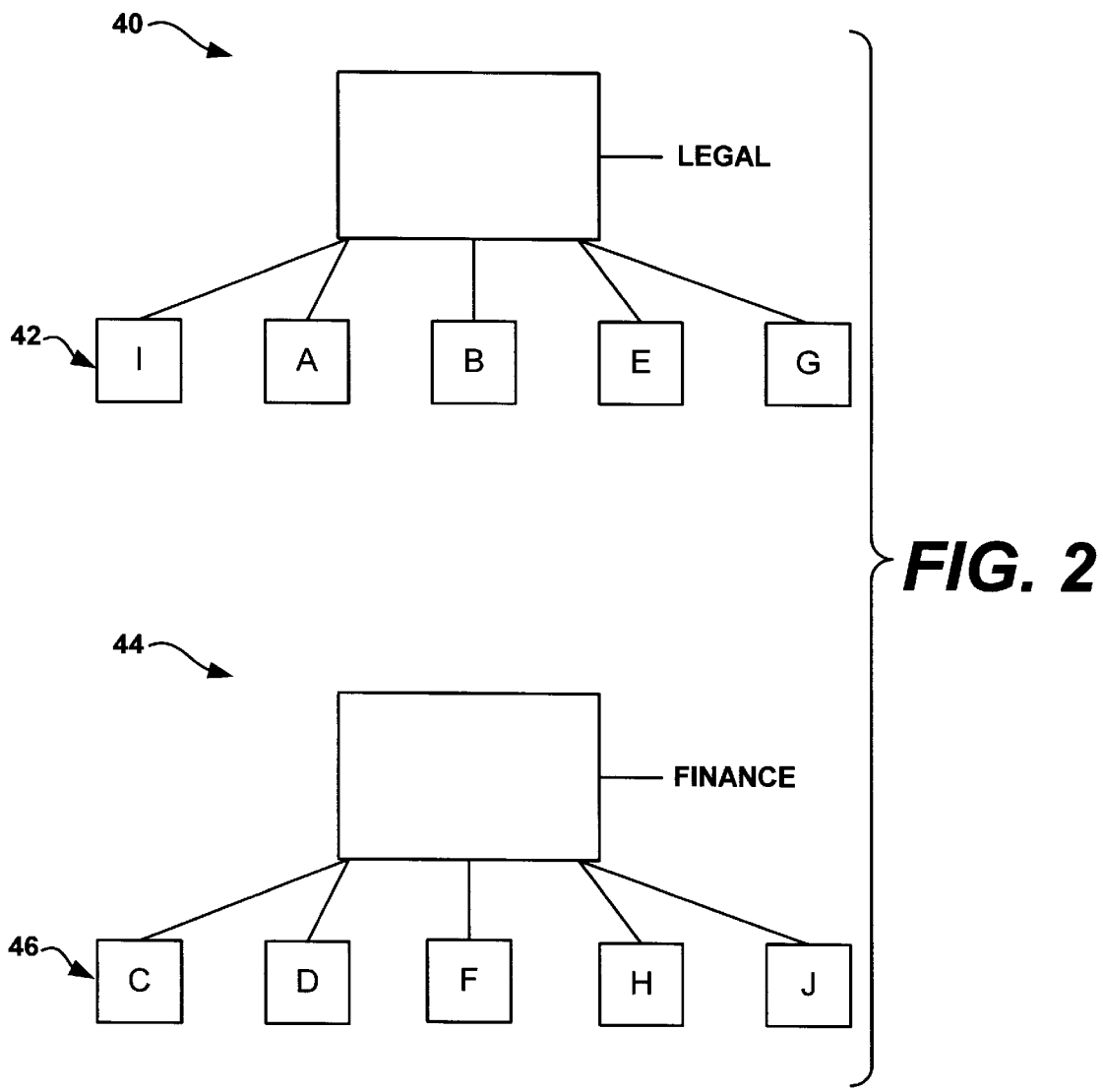
FIG. 2 illustrates conceptually logical groups of distributed machines in the network.
Figure 3:
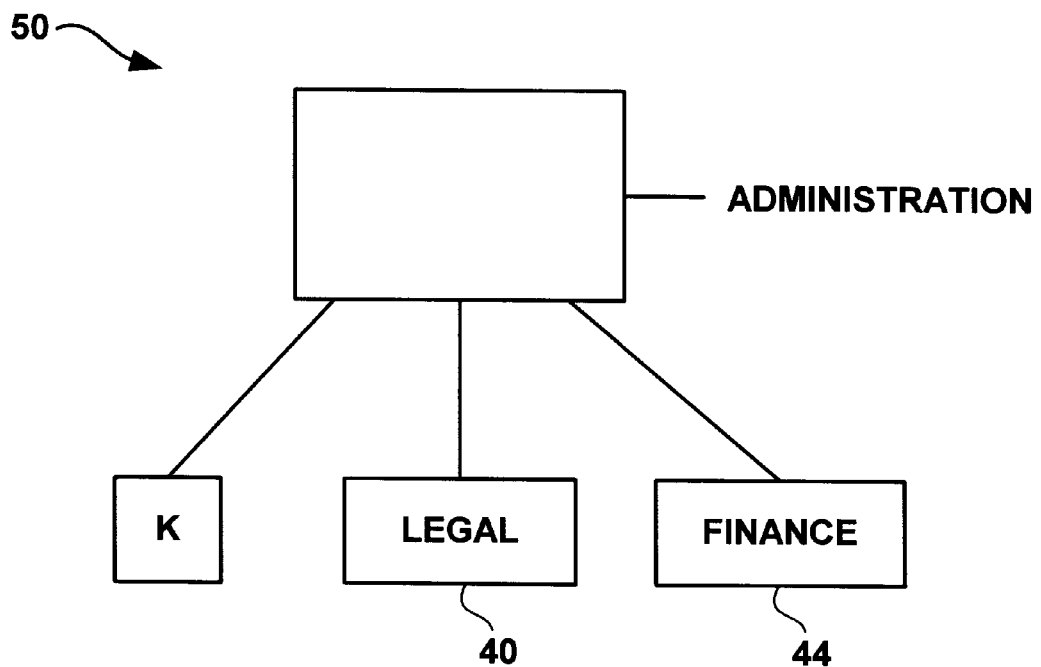
FIG. 3 illustrates conceptually a logical group including other logical groups of distributed machines in the network.

For example, as shown in FIG. 2, a logical group of objects 40, herein labeled "legal" may include several machines within the network such as machines A, B, E, G and I as shown at 42. Similarly, another group 44, "finance," may include machines C, D, F, H and J as indicated at 46. It is also possible for logical groups to be defined by grouping together other logical groups, as well as other machines. For example, a logical group "administration" labeled 50 in FIG. 3, could be comprised of the legal group 40, finance group 44 and machine K. Note that a machine also may represent an individual user as well. Such logical groups may include an entire LAN such as LAN 30 in FIG. 1, or an entire location such as defined by network device 26.

Figure 4:
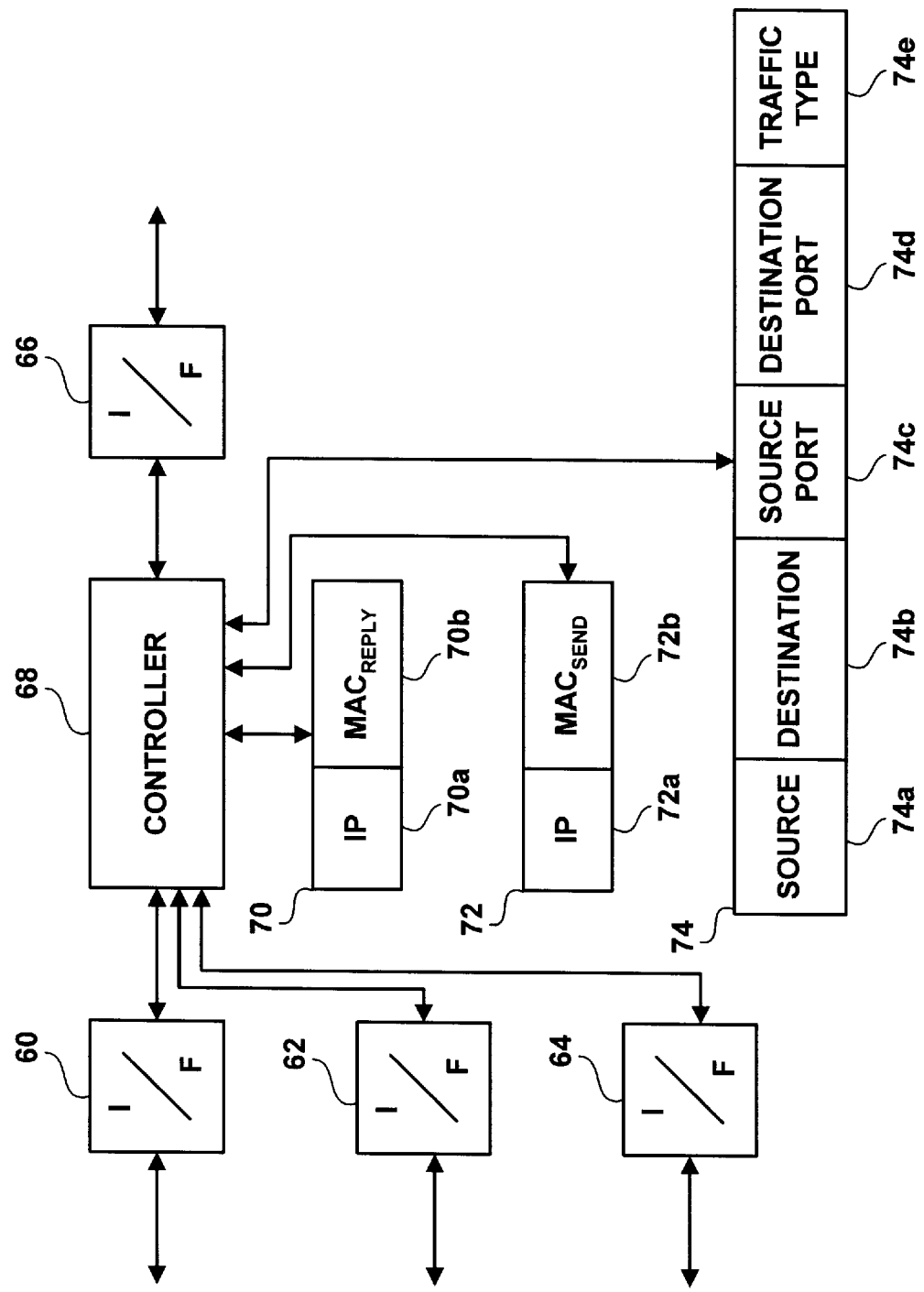
FIG. 4 is a block diagram of the network device in one embodiment of the invention.

Network devices 26 and 28 enable the definition of virtual local area networks, in some cases over a virtual private network defined on a wide-area network. To perform this function, these devices have a structure such as shown in FIG. 4. The network device contains interfaces (60, 62 and 64) to each local area network to which it is connected. Any number of such interfaces may be provided. Similarly, an interface 66 connects the device to the wide area network. Any number of such interfaces may be calculated, including Ethernet, broadband and V.34 connections. A controller 68 processes packets received through the interface 60 according to information found in the address resolution protocol (ARP) table 70, routing table 72 and filter table 74. The ARP table 70 contains information that is used by the network device to translate a received Internet protocol (IP) address 70a from an ARP request, or other network layer address, into a corresponding media access control (MAC) address 70b, sometimes called a hardware address, that is returned to the sender of the ARP request to send a message to the designated IP address. The routing table 72 translates an IP address 72a, indicated as the destination of a message received by the network device, into a corresponding MAC address 72b associated with the destination of the message to which the network device will send the message. The filter table 74 is used to determine whether the source and destination of a message may communicate over a specified port. In particular, each entry in the filter table 74 specifies a source address 74a, a destination address 74b, a source port 74c, a destination port 74d and a traffic type 74e. The use of these three tables by the controller 68 to control routing and filtering of packets through this network device will now be described in connection with FIGS. 5 through 7.

Figure 5:
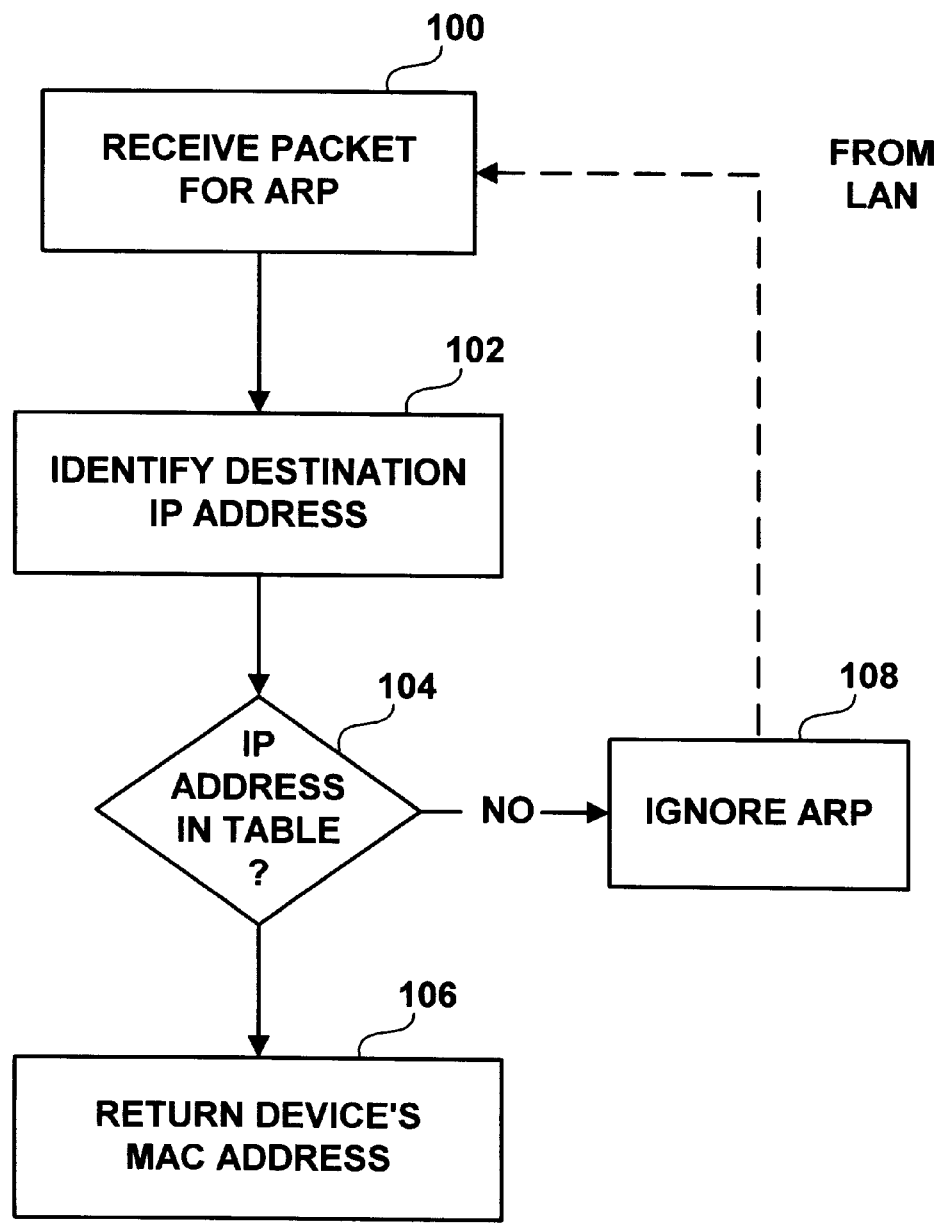
FIG. 5 is a flowchart describing how the network device of FIG. 4 processes an address resolution protocol request.

FIG. 5 is a flow chart describing how address resolution protocol packets are processed by the network device. First, an address resolution protocol packet is received by the device from a sender of a message on a local area network in step 100. The packet is inspected to identify the network layer address, e.g. IP address, of the intended destination in step 102. If this IP address is in the ARP table of the network device, as determined in step 104, the MAC address of the network device is returned in step 106. Otherwise, the address resolution protocol request is ignored in step 108. As a result, the sender perceives the network device to be the destination of the message to be sent.

Figure 6:
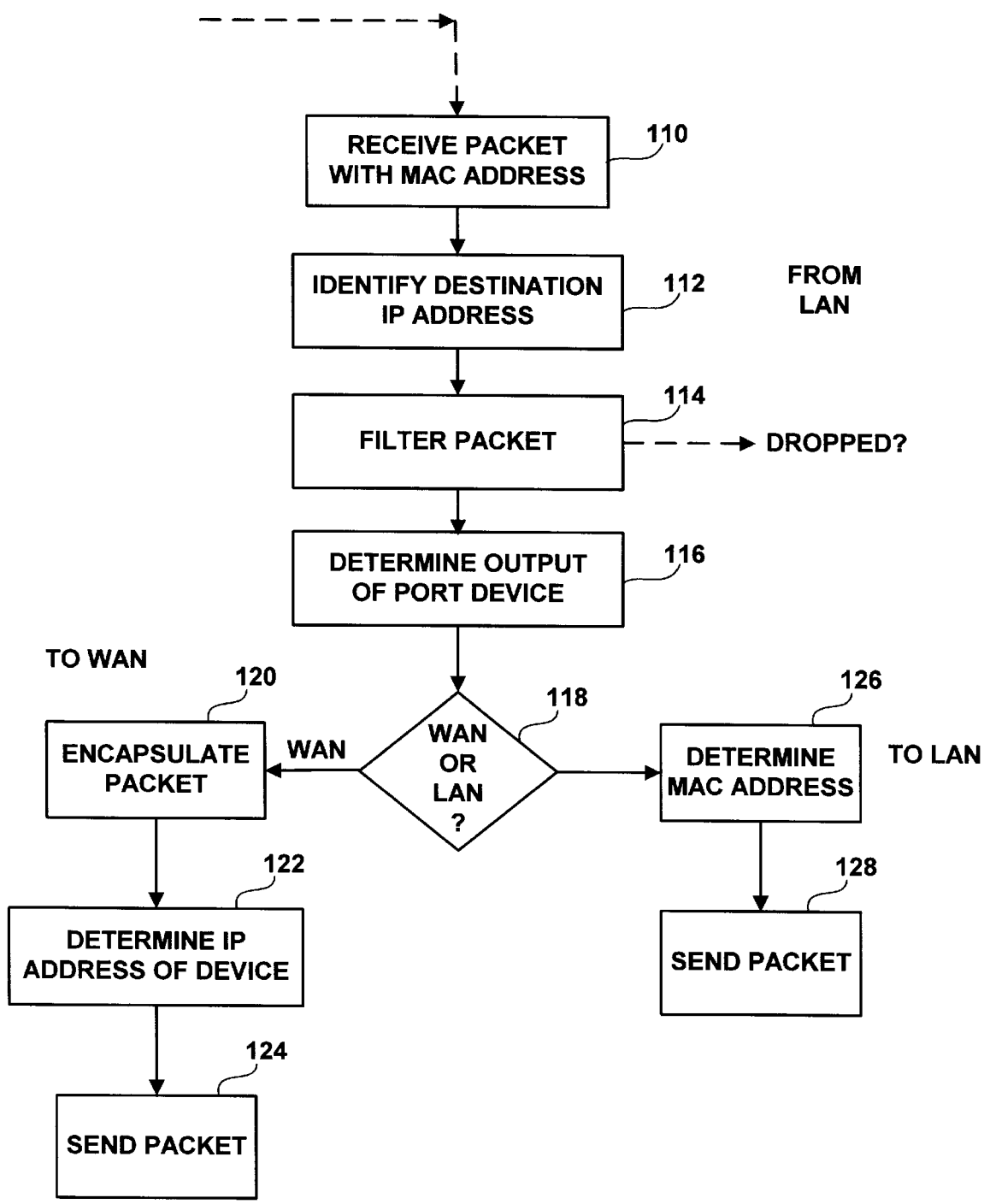
FIG. 6 is a flowchart describing how the network device of FIG. 4 processes a packet sent from a machine on one LAN to a machine on another LAN or WAN.

FIG. 6 illustrates how the network device processes a packet that is sent by a machine on one LAN connected to the network device to a machine on another LAN connected to the network device. First, the packet is received in step 110 by the network device since the sender directs the packet to the MAC address of the network device. This packet is a link layer packet. The IP address of the intended destination then is read by the network device from the packet in step 112. The packet is then filtered in step 114 by reference to the filter tables. In particular, if the source and destination and ports and addresses specified for the packet are not found in the filter table, the packet is dropped. Otherwise, the output port of the network device corresponding to the specified IP address is then determined from the routing table in step 116. If the output port is on a WAN, as determined in step 118, the packet is encrypted and encapsulated in step 120 to form an encrypted IP packet that still contains the IP address of the intended destination. It is possible simple to encrypt the payload of the IP packet instead. The IP address of the network device (e.g., 28) over the WAN that controls access to the intended destination is then determined in step 122. The encrypted IP packet is sent in step 124 to the specified network device. How the recipient network device processes the received packet will be described below in connection with FIG. 7. If, in step 118, it is determined that the packet is destined to another machine on a different LAN, the MAC address of the machine corresponding to the specified destination IP address (determined in step 112) is then determined in step 126. This MAC address may be determined from routing table within the network device or by an address resolution protocol message broadcast to the LAN by the network device. Given the MAC address of the intended destination, the packet is then sent to the desired destination in step 128.

Using this process for routing and filtering a packet, a packet of any transport protocol type for the LAN may be sent to any machine or any LAN, including over a WAN, that has the same transport protocol. In addition, the filtering performed by the filter table using information related to the link, network and transport layer information in the packet enables different groups of users to communicate in different ways and allows a user to be in many such groups. Additional security may be provided by binding machines to both MAC and IP addresses and having filters that check both the MAC and IP address of a source of a message. Such binding may be performed using domain name servers (DNS) and dynamic host control protocol (DHCP) servers.

Figure 7:
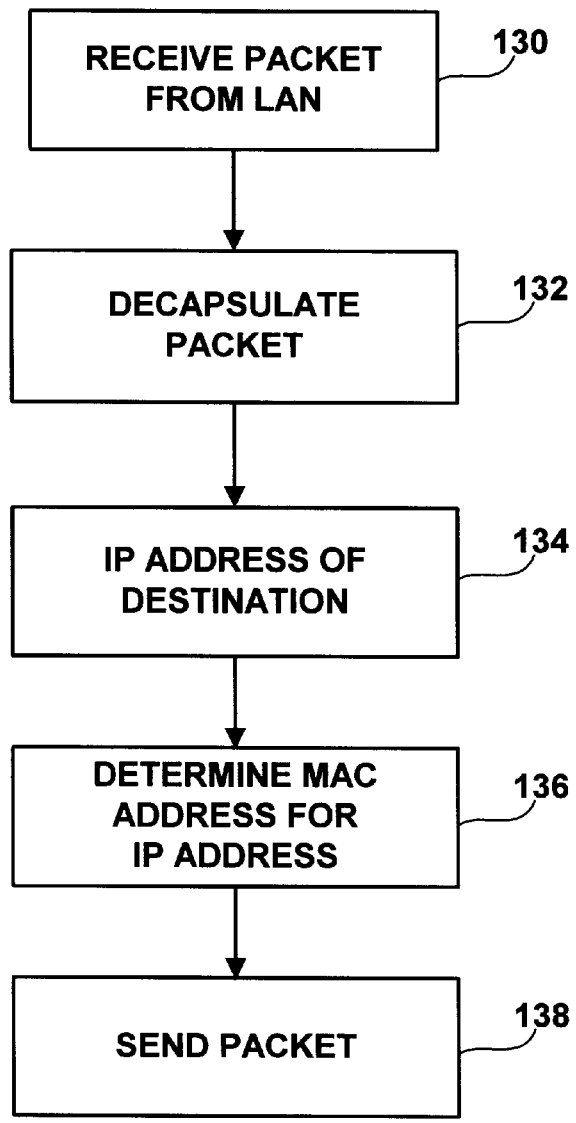
FIG. 7 is a flowchart describing how the network device of FIG. 4 processes a packet sent over the WAN by a machine on one LAN connected to another network device to a machine on another LAN connected to the network device.

Referring now to FIG. 7, how the network device processes packets received from the WAN port will now be described. First, the packet is received in step 130. The packet is unencapsulated and decrypted in step 132. Appropriate authorization also may be performed between the two network devices prior to the sending and receiving of this packet. The IP address of the intended destination is then read from the unencapsulated and decrypted packet in step 134. Since the packet already should have been filtered from the source network device, such filtering need not be performed again. In step 136, the MAC address for the machine corresponding to the identified IP address is then determined. The packet is then sent to the correct machine in step 138.

The ARP table, routing table and filtering table can be defined in a number of ways. For example, each network device may have its own IP address and port specified for receiving communication from configuration software on any machine connected to the device. A machine could be connected to the device through the network or through a dedicated serial interface to the device. Such configuration programs are common with available network devices. In addition, it may be preferable to ensure that all machines have the same configuration throughout an enterprise and that this configuration be performed simultaneously. One process forming such configuration as shown in U.S. patent application Ser. No. 08/957,048, filed on Oct. 24, 1997, herewith, entitled "COMPUTER SYSTEM AND COMPUTER-IMPLEMENTED PROCESS FOR SIMULTANEOUS CONFIGURATION AND MONITORING OF A COMPUTER NETWORK," by Lalit Jain and Bret Harsham, which is hereby incorporated by reference and commonly owned with this application.

With this network device, virtual LANs may be defined over various wide area networks in a manner that supports any transport protocol that may be used on the Ethernet network protocol. For example, virtual networks may be defined over a wide area network for local area networks that use the AppleTalk protocol, Internet Package Exchange (IPX) protocol and the Internet Protocol (IP) and other protocols that operate using Ethernet networks. The network device implements these virtual networks transparent to the actual physical local area network. In particular, a machine on one local area network is not aware that a machine on another local area network actually is on a separate network. In combination with simultaneous configuration of the network, process of implementing, configuring and monitoring of an enterprise-wide network is simplified. Enterprise-wide security may be implemented to protect against both internal and external security breaches.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalent thereto.

What is claimed is:

1. A network device comprising:

a first interface for connection to a first local area network of machines having a link layer, a network layer and a transport layer;

a second interface for connection to a second local area network of machines having a link layer, a network layer and a transport layer;

wherein the network device has a media access control address on each of the first and second local area networks;

a mapping table for mapping network addresses at the network layer of machines on the second local area network to the media access control address of the network device on the first local area network;

means for routing packets from machines on the first local area network to machines on the second local area network according to the mapping table; and means for filtering packets using information in the packets from the link, network and transport layers.

2. The network device of claim 1, further comprising:

a third interface for connection to a wide area network of machines, having a network layer and a transport layer, wherein the network device has an address at the network layer of the wide area network, and wherein the mapping table maps addresses of machines on the wide area network to the media access control address of the network device on the first local area network.

3. The network device of claim 2, further comprising means, operative when a packet is routed to the wide area network, for performing authentication procedures with another network device and for sending the packet in encrypted form to the other network device.

4. The network device of claim 3, further comprising means for receiving a packet from the wide area network through the third interface and for routing the received packet to a destination on one of the first and second local area networks.

5. A process performed by a network device for transferring a packet between a first machine on a first network and a second machine on a second network, comprising the steps of:

receiving an address resolution protocol request from the first machine indicating a network layer network address of a desired machine;

returning an indication of a link layer network address of the network device if the network layer network address of the desired machine corresponds to a machine on the second local area network;

receiving a link layer packet in the having a destination address of the network device, wherein the packet contains a network layer packet having a network layer address of the desired machine;

determining the link layer address of the desired machine in the second local area network; and sending a link layer packet encapsulating the network layer packet received by the network device from the first machine.

* * * * *